(12) United States Patent
Murata et al.

(10) Patent No.: US 11,719,972 B2
(45) Date of Patent: Aug. 8, 2023

(54) DISPLAY DEVICE

(71) Applicant: Sharp Kabushiki Kaisha, Sakai (JP)

(72) Inventors: Koji Murata, Sakai (JP); Kazutaka Hanaoka, Sakai (JP); Kimiaki Nakamura, Sakai (JP); Atsuko Kanashima, Sakai (JP); Mariko Honda, Sakai (JP); Shinji Shimada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/833,924

(22) Filed: Jun. 7, 2022

(65) Prior Publication Data

US 2023/0004031 A1    Jan. 5, 2023

(30) Foreign Application Priority Data

Jun. 10, 2021    (JP) .................................. 2021-097570

(51) Int. Cl.
*G02F 1/1334*    (2006.01)
*G02F 1/13357*    (2006.01)

(52) U.S. Cl.
CPC ...... *G02F 1/1334* (2013.01); *G02F 1/133603* (2013.01); *G02F 1/133615* (2013.01)

(58) Field of Classification Search
CPC ............... G02F 1/1334; G02F 1/13342; G02F 1/133603; G02F 1/133615
See application file for complete search history.

(56) References Cited

U.S. PATENT DOCUMENTS

| | | | |
|---|---|---|---|
| 9,548,013 B2* | 1/2017 | Kobayashi | .......... G02F 1/13476 |
| 2004/0105053 A1 | 6/2004 | Ozeki et al. | |
| 2014/0036176 A1 | 2/2014 | Shinkai et al. | |
| 2015/0279256 A1* | 10/2015 | Kobayashi | ........... G09G 3/3413 |
| | | | 345/694 |
| 2016/0116768 A1* | 4/2016 | Okuyama | ......... G02F 1/133615 |
| | | | 349/33 |
| 2016/0187724 A1* | 6/2016 | Masuda | ............... G02B 6/0063 |
| | | | 349/65 |

(Continued)

FOREIGN PATENT DOCUMENTS

| | | |
|---|---|---|
| JP | 2004-157492 A | 6/2004 |
| JP | 2012-252993 A | 12/2012 |

(Continued)

*Primary Examiner* — Jia X Pan
(74) *Attorney, Agent, or Firm* — Keating & Bennett, LLP

(57) ABSTRACT

The display device includes a liquid crystal panel including a polymer dispersed liquid crystal (PDLC) layer and a light source, the PDLC layer containing a polymer network and liquid crystal components dispersed in the polymer network, the light source being apart from the liquid crystal panel with an air layer, and configured to emit light toward the liquid crystal panel from an oblique direction, the end portion and the central portion of the PDLC layer each having, in the scattering state, an angle dependence which changes a transmittance of light to be emitted from a front surface based on an angle at which light is incident on a back surface of the PDLC layer, with the angle dependence of the end portion being different from the angle dependence of the central portion, the light source irradiating the end portion and the central portion with light at different angles.

8 Claims, 7 Drawing Sheets

(56) References Cited

U.S. PATENT DOCUMENTS

| | | | |
|---|---|---|---|
| 2019/0204632 A1 | 7/2019 | Okuyama et al. | |
| 2020/0110314 A1 | 4/2020 | Jia et al. | |
| 2020/0174294 A1 | 6/2020 | Okuyama et al. | |
| 2021/0405465 A1 | 12/2021 | Nakamura et al. | |
| 2022/0075216 A1 | 3/2022 | Okuyama et al. | |
| 2023/0024383 A1* | 1/2023 | Murata | G02F 1/133622 |

FOREIGN PATENT DOCUMENTS

| | | |
|---|---|---|
| JP | 2016-85452 A | 5/2016 |
| JP | 2020-148955 A | 9/2020 |

* cited by examiner

DISPLAY DEVICE

CROSS-REFERENCE TO RELATED APPLICATIONS

The present application claims priority under 35 U.S.C. § 119 to Japanese Patent Application No. 2021-097570 filed on Jun. 10, 2021, the contents of which are incorporated herein by reference in their entirety.

BACKGROUND OF THE INVENTION

Field of the Invention

The disclosure relates to display devices. More specifically, the disclosure relates to a see-through display including a polymer dispersed liquid crystal panel and a light source.

Description of Related Art

Liquid crystal display devices are display devices utilizing a liquid crystal composition to display images. Typical display methods thereof include applying voltage to the liquid crystal composition sealed between paired substrates to change the alignment of liquid crystal components in the liquid crystal composition based on the applied voltage, thus controlling the amount of light passing through the liquid crystal display device. Such liquid crystal display devices are used in a variety of fields owing to their features including their thin profile, light weight, and low power consumption.

See-through displays have drawn attention which are capable of providing display where the background of its liquid crystal display device can be seen through the device. Liquid crystal display devices using a polymer dispersed liquid crystal (PDLC) material have been developed as liquid crystal display devices for see-through displays. A PDLC material contains liquid crystal components dispersed in a polymer network. Application of voltage to the PDLC material changes the alignment of the liquid crystal components and produces a difference in refractive index between the liquid crystal components and the polymer network. The liquid crystal display devices use this difference to switch between a transparent state and a scattering state.

For example, JP 2016-85452 A discloses a display device including a pair of transparent substrates facing each other with a space in between; a light modulation layer which is disposed between the transparent substrates, has a predetermined anisotropy of refractive index, and includes light modulation elements differing in response property to an electric field generated by electrodes formed on the transparent substrates; and a light source that applies light of a predetermined color to a side surface of the light modulation layer, wherein the light modulation layer transmits incident light from the light source when the electric field is not generated, and the light modulation layer scatters the incident light from the light source toward the transparent substrates.

BRIEF SUMMARY OF THE INVENTION

Examples of the light source for see-through displays include edge-lit backlights. With an edge-lit backlight, a liquid crystal display device can be reduced in thickness. Examples of the edge-lit backlight include light-guiding type backlights using a light guide plate. The light-guiding type backlights using a light guide plate have a light source on a side surface of the light guide plate. Light emitted from the light source and incident on the side surface of the light guide plate is reflected in the light guide plate multiple times, and then emitted from the front surface.

Meanwhile, part of the light reflected in the light guide plate is lost due to diffraction by the components of a liquid crystal panel, such as thin film transistors (TFTs). More light is lost at a position farther from the light source, which possibly leads to a decrease in front characteristics such as the contrast ratio and the luminance in the central portion of the display screen. An examination made by the present inventors demonstrated that when a light-guiding type backlight was used to display images on liquid crystal panels containing a PDLC material, a 19-inch large display device had a contrast ratio of 2 or lower and a luminance of 60 cd/m$^2$ or lower at the center of its display screen in the scattering state. The luminance in the central portion of the display screen was about ¼ of the luminance in the end portions of the display screen, meaning that the luminance gradient was high between the end portions and the central portion of the display screen. Thus, there have been problems in displaying images with a uniform luminance.

Such a decrease in front characteristics in the central portion of a display screen was more significant on display screens with a larger area. In addition, part of transmitted light is lost due to scattering also when the light passes through the PDLC material. It is therefore difficult to achieve both an increase in area of the display screen and favorable front characteristics (high contrast ratio and high luminance) in thin-profile see-through displays.

In the display device disclosed in JP 2016-85452 A, light is incident on the side surface of the light modulation layer, meaning that more light is lost at a position closer to the center of the display screen as in the case of using a light-guiding type backlight. This suggests that the display device would fail to achieve sufficient front characteristics when increased in size.

The present invention aims to provide a thin-profile see-through display capable of achieving a high contrast ratio and a high luminance even with a display screen with a large area.

(1) One embodiment of the present invention is directed to a display device including: a liquid crystal panel including a pair of substrates and a polymer dispersed liquid crystal layer held between the substrates, and a light source behind a back surface of the liquid crystal panel, the substrates including an electrode that applies voltage to the polymer dispersed liquid crystal layer, the polymer dispersed liquid crystal layer containing a polymer network and liquid crystal components dispersed in the polymer network, the light source being apart from the liquid crystal panel with an air layer in between, extending along at least one outer edge of the liquid crystal panel, and configured to emit light toward the liquid crystal panel from an oblique direction, the polymer dispersed liquid crystal layer being controlled to be in a transparent state where a background is seen through the display device with no voltage applied and shift into a scattering state where light emitted from the light source and incident on the polymer dispersed liquid crystal layer is scattered with voltage applied, the polymer dispersed liquid crystal layer including, in a plan view, an end portion closer to the light source and a central portion farther from the light source than the end portion is, the end portion and the central portion each having, in the scattering state, an angle dependence which changes a transmittance of light to be emitted from a front surface based on an angle at which light is incident on a back surface of the polymer dispersed liquid crystal layer, with the angle dependence of the end portion being different from the angle dependence of the central portion, the light source irradiating the end portion and the central portion with light at different angles.

(2) In an embodiment of the present invention, the display device includes the structure (1), and the liquid crystal components in the central portion has a higher anisotropy of refractive index than the liquid crystal components in the end portion.

(3) In an embodiment of the present invention, the display device includes the structure (1) or (2), and the polymer dispersed liquid crystal layer contains a chiral agent in the end portion and does not contain a chiral agent in the central portion.

(4) In an embodiment of the present invention, the display device includes the structure (1) or (2), and with no voltage applied, a twist angle of the liquid crystal components in the end portion is greater than a twist angle of the liquid crystal components in the central portion.

(5) In an embodiment of the present invention, the display device includes the structure (1), and the polymer dispersed liquid crystal layer contains a chiral agent in both the central portion and the end portion and has a greater thickness in the end portion than in the central portion.

(6) In an embodiment of the present invention, the display device includes any one of the structures (1) to (5), and the polymer dispersed liquid crystal layer has a higher density of the polymer network in the central portion than in the end portion.

(7) In an embodiment of the present invention, the display device includes any one of the structures (1) to (6), and the electrode includes a pair of electrodes that are disposed in the respective substrates and face toward the polymer dispersed liquid crystal layer.

(8) In an embodiment of the present invention, the display device includes any one of the structures (1) to (7), the light source includes light-emitting elements of multiple colors, and the light-emitting elements of multiple colors are driven based on a field-sequential color system in which the light-emitting elements are turned on time-divisionally.

The present invention can provide a thin-profile see-through display capable of achieving a high contrast ratio and a high luminance even with a display screen having a large area.

DETAILED DESCRIPTION OF THE INVENTION

The present invention is described in more detail based on the following embodiment with reference to the drawings. The present invention is not limited to these embodiments.

Figure 1:
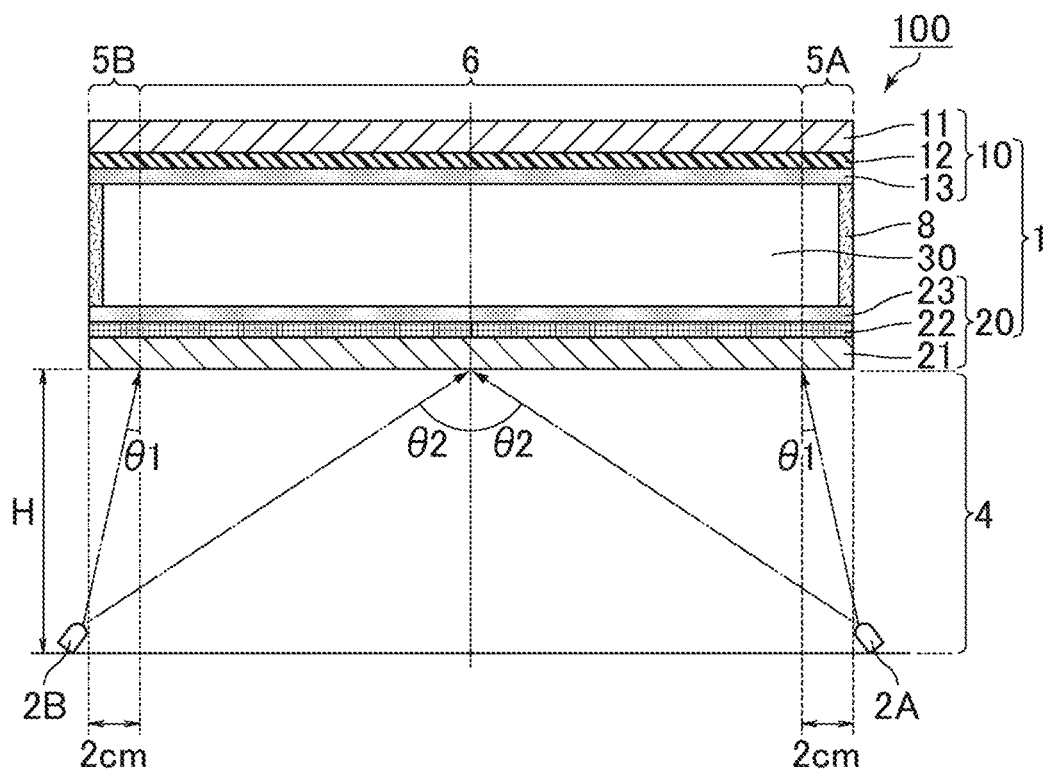
FIG. 1 is a schematic cross-sectional view of an example of a display device of an embodiment.

FIG. 1 is a schematic cross-sectional view of an example of a display device of an embodiment. As shown in FIG. 1, a display device 100 includes a liquid crystal panel 1 and a light source 2 behind the back surface of the liquid crystal panel 1. The light source 2 may be fixed to a housing (not shown), for example. Herein, the "front surface" refers to the surface that is closer to the viewer and defines the display screen of the display device. The "back surface" is the surface that is farther from and opposite the display screen (front surface) of the display device.

The liquid crystal panel 1 includes a pair of substrates 10 and 20 and a polymer dispersed liquid crystal layer 30. The substrates 10 and 20 hold the polymer dispersed liquid crystal layer 30 in between. The substrate 10 may include a transparent base material 11, an electrode 12, and an alignment film 13. The substrate 20 may include a transparent base material 21, an electrode 22, and an alignment film 23.

The transparent base materials 11 and 21 may be, for example, glass substrates or plastic substrates. The transparent base materials 11 and 21 have a total light transmittance of 90% or higher, for example. The total light transmittance is measured by a method in conformity with JIS K 7361-1. The total light transmittance can be measured with, for example, the haze meter "Haze Meter NDH2000" available from Nippon Denshoku Industries Co., Ltd.

The substrates 10 and 20 each include an electrode that applies voltage to the polymer dispersed liquid crystal layer 30. FIG. 1 shows the case where the electrodes are the pair of electrodes 12 and 22 that are respectively disposed in the substrates 10 and 20 and face toward the polymer dispersed liquid crystal layer 30. Preferably, the electrodes 12 and 22 are connected to different power supplies and supplied with different electric potentials. In the case in FIG. 1, voltage applied to the polymer dispersed liquid crystal layer 30 generates a vertical electric field in the thickness direction of the polymer dispersed liquid crystal layer 30 between the electrodes 12 and 22. The electrodes 12 and 22 may be made of, for example, a transparent conductive material such as indium tin oxide (ITO) or indium zinc oxide (IZO).

The display device 100 may include pixels arranged in a matrix pattern in a plan view. In this case, the display device 100 can be an active matrix-driven display device. One of the electrodes 12 and 22 may include pixel electrodes arranged in the respective pixels, and each pixel electrode may be controlled to be turned on or off by a switching element such as a TFT disposed in the corresponding pixel. The other of the electrodes 12 and 22 may be, for example, a planar solid electrode, and may be a common electrode supplied with a common electric potential. Both of the electrodes 12 and 22 may be planar solid electrodes without pixels, so that the transmittance of the entire surface of the display device 100 is uniformly controlled. In this case, the display device 100 can be used as a dimmable panel or lighting equipment, for example.

The alignment film 13 is preferably disposed in the substrate 10 to face the polymer dispersed liquid crystal layer 30 and in contact with the polymer dispersed liquid crystal layer 30. The alignment film 23 is preferably disposed in the substrate 20 to face the polymer dispersed liquid crystal layer 30 and in contact with the polymer dispersed liquid crystal layer 30. The alignment films 13 and 23 control the alignment azimuth of the liquid crystal components dispersed in the polymer network with no voltage applied to the polymer dispersed liquid crystal layer 30. The alignment films 13 and 23 have preferably been subjected to parallel alignment treatment such that, with no voltage applied, the liquid crystal components are in homogeneous alignment in which the long axes of the liquid crystal components are aligned parallel to the surfaces of the substrate 10 and the substrate 20. The alignment films 13 and 23 may be made of any material usually used in the field of liquid crystal display devices, such as an alignment film material for rubbing alignment or an alignment film material for photoalignment. The alignment films 13 and 23 are preferably those having been subjected to alignment treatment by rubbing or photoalignment.

The polymer dispersed liquid crystal (PDLC) layer 30 contains a polymer network and liquid crystal components dispersed in the polymer network. The polymer dispersed liquid crystal layer 30 is controlled to be in a transparent state where the background is seen through the display device with no voltage applied and shift into a scattering state where light emitted from the light source and incident on the polymer dispersed liquid crystal layer 30 is scattered with voltage applied. Such a display method of providing the transparent state with no voltage applied and providing the scattering state with voltage applied is also referred to as a reverse mode. Meanwhile, the display method of providing the scattering mode with no voltage applied and providing the transparent state with voltage applied is also referred to as a normal mode. The state "with no voltage applied" means when the voltage applied to the polymer dispersed liquid crystal layer 30 is lower than the threshold voltage of the liquid crystal components (including no voltage application). The state "with voltage applied" means when the voltage applied to the polymer dispersed liquid crystal layer 30 is equal to or higher than the threshold voltage of the liquid crystal components.

Figure 2A:
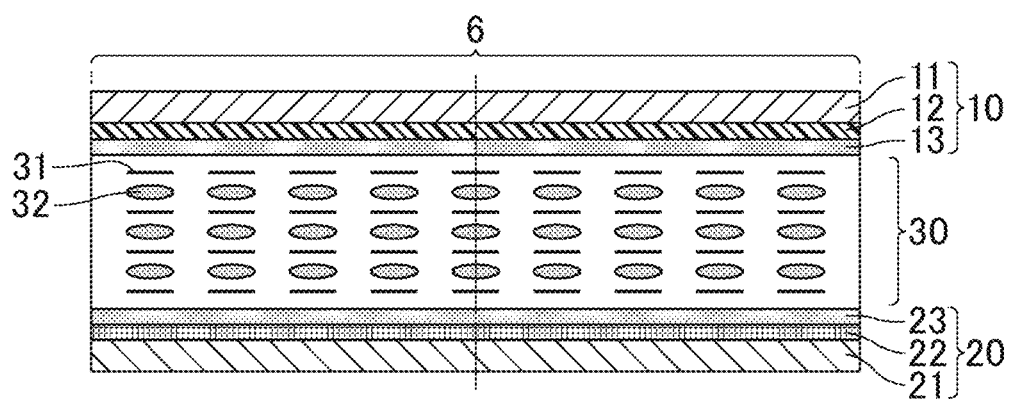
FIG. 2A is a schematic cross-sectional view showing a transparent state of the liquid crystal panel in FIG. 1.
Figure 2B:
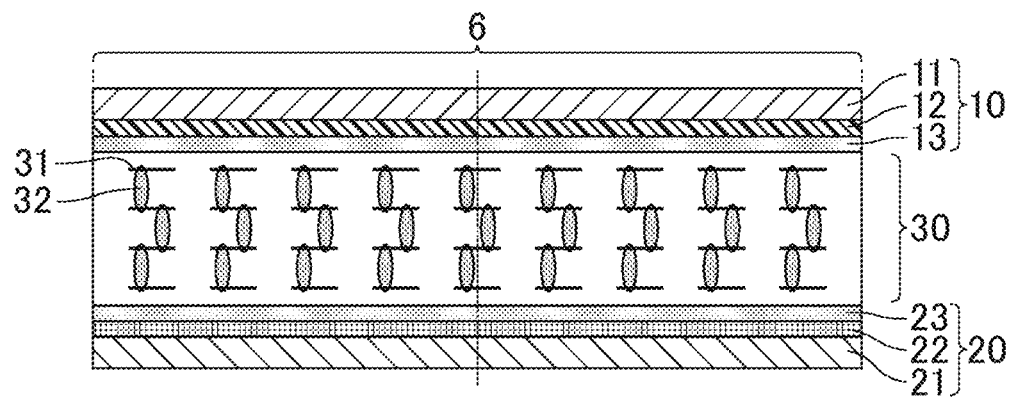
FIG. 2B is a schematic cross-sectional view showing a scattering state of the liquid crystal panel in FIG. 1.

Hereinbelow, the alignment of liquid crystal components in the transparent state and the scattering state is described with reference to FIG. 2A and FIG. 2B. FIG. 2A is a schematic cross-sectional view showing the transparent state of the liquid crystal panel in FIG. 1. FIG. 2B is a schematic cross-sectional view showing the scattering state of the liquid crystal panel in FIG. 1. FIG. 2A and FIG. 2B show the central portion of the liquid crystal panel.

As shown in FIG. 2A, with no voltage applied, preferably, the alignment azimuths of the polymer network 31 and the liquid crystal components 32 are substantially the same as each other. FIG. 2A shows a case where both the polymer network 31 and the liquid crystal components 32 are homogeneously aligned parallel to the surfaces of the substrate 10 and the substrate 20. With no voltage applied, in all the directions including the thickness direction of the polymer dispersed liquid crystal layer 30, there is almost no difference in abnormal light refractive index ne between the liquid crystal components 32 and the polymer network 31 and almost no difference in normal refractive index no between the liquid crystal components 32 and the polymer network 31. Thus, light emitted from the light source passes through the polymer dispersed liquid crystal layer 30, so that the liquid crystal panel is in the transparent state.

The transparent state is a state of being transparent to light. The polymer dispersed liquid crystal layer 30 in the transparent state may have a transmittance of 80% or higher or 90% or higher. The upper limit of the transmittance of the polymer dispersed liquid crystal layer 30 in the transparent state is, for example, 100%. Herein, the transmittance of the polymer dispersed liquid crystal layer in each of the transparent state and the scattering state is a parallel light transmittance. The parallel light transmittance can be measured with "LCD5200 (photal)" available from Otsuka Electronics Co., Ltd.

As shown in FIG. 2B, with voltage applied, the molecules of the polymer network 31 are aligned horizontally to the surfaces of the substrate 10 and the substrate 20, while the liquid crystal components 32 are aligned vertically to the surfaces of the substrate 10 and the substrate 20. With voltage applied, electric fields generated in the polymer dispersed liquid crystal layer 30 change the alignment azimuth of the liquid crystal components 32, while having no influence on the polymer network 31. Thus, in all the directions including the thickness direction of the polymer dispersed liquid crystal layer 30, the difference in abnormal light refractive index ne between the liquid crystal components 32 and the polymer network 31 and the difference in normal refractive index no between the liquid crystal components 32 and the polymer network 31 are large. Non-polarized light incident on the polymer dispersed liquid crystal layer 30 is scattered without dependence on polarization, so that the polymer dispersed liquid crystal layer 30 is in the scattering state.

The scattering state is a state of scattering light, making the liquid crystal panel appear like frosted glass. The polymer dispersed liquid crystal layer 30 in the scattering state may have a transmittance of 10% or lower or 8% or lower. The lower limit of the transmittance of the polymer dispersed liquid crystal layer 30 in the scattering state is, for example, 0%. The haze showing the light scattering ratio of the polymer dispersed liquid crystal layer 30 in the scattering state varies based on the voltage applied, and may be, for example, 80% or higher or 90% or higher. The upper limit of the haze showing the light scattering ratio of the polymer dispersed liquid crystal layer 30 in the scattering state is, for example, 100%. Herein, the haze is measured by a method in conformity with JIS K 7136. The haze is measured with, for example, the haze meter "Haze Meter NDH2000" available from Nippon Denshoku Industries Co., Ltd. The light may be visible light.

The display device 100 adjusts the amount of light passing through the liquid crystal panel 1 by varying the difference in refractive index ne and the difference in refractive index no between the liquid crystal components 32 and the polymer network 31 in the polymer dispersed liquid crystal layer 30. Thus, the display device 100 requires no polarizing plate required in common liquid crystal panels.

The polymer dispersed liquid crystal layer 30 preferably has a thickness of 3 μm or more and 10 μm or less.

The anisotropy of dielectric constant (Δε) of the liquid crystal components 32 defined by the following formula may be positive or negative, but is preferably positive. More preferably, the anisotropy of dielectric constant of the liquid crystal components 32 is more than 0 and 20 or less. The long axis direction of each liquid crystal component is the slow axis direction. Δε=(dielectric constant in long axis direction)−(dielectric constant in short axis direction)

The liquid crystal components 32 preferably have an anisotropy of refractive index Δn of 0.14 or higher. The upper limit of the Δn is, for example, 0.28. A higher Δn of the liquid crystal is more preferred, so that the difference in abnormal light refractive index ne between the liquid crystal components 32 and the polymer network 31 and the difference in normal light refractive index no between the liquid crystal components 32 and the polymer network 31 can be increased.

The liquid crystal components 32 preferably have a rotational viscosity γ of 100 mPa·s or higher and 400 mPa·s or lower. With the γ falling within the range above, the response speed of the liquid crystal components 32 can be high and, in driving of the light source 2 based on the field-sequential color system described below, color mixing can be reduced or prevented. The γ is more preferably 200 mPa·s or lower.

The liquid crystal components 32 can be, for example, a tolan-type liquid crystal material (liquid crystal material having a —C≡C— bond (carbon-carbon triple bond) as a linking group). Specific examples of the tolan-type liquid crystal material include liquid crystal materials having a structure represented by the following formula (L1)

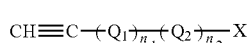
(L1)

In the formula, $Q_1$ and $Q_2$ each independently represent an aromatic ring group, X represents a fluorine group or a cyano group, and $n_1$ and $n_2$ each independently represent 0 or 1.

The symbols $n_1$ and $n_2$ in the formula (L1) are not 0 at the same time. In other words, the sum of $n_1$ and $n_2$ is 1 or 2.

The aromatic ring groups in the formula (L1) may have a substituent.

In the formula (L1), preferably, $Q_1$ and $Q_2$ each independently have any one of the structures represented by the following formulas (L2-1) to (L2-7).

(L2-1)

(L2-2)

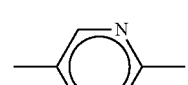
(L2-3)

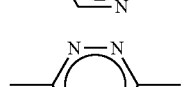
(L2-4)

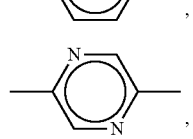
(L2-5)

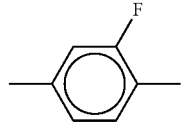
(L2-6)

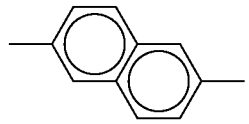
(L2-7)

Specific examples of the structure represented by the formula (L1) in the liquid crystal material include the following structures.

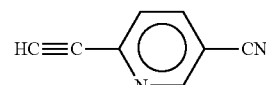

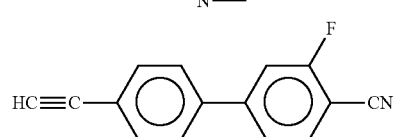

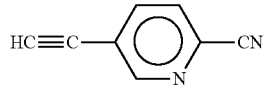

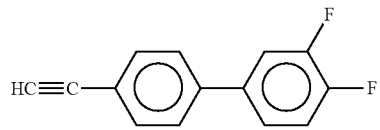

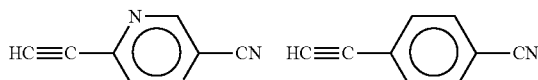

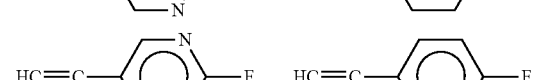

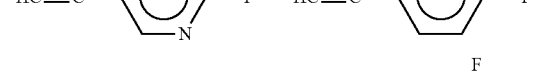

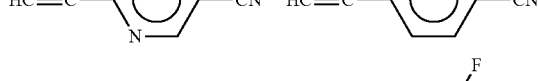

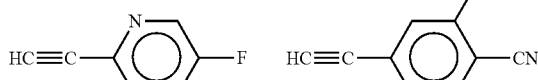

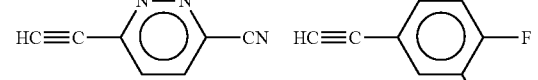

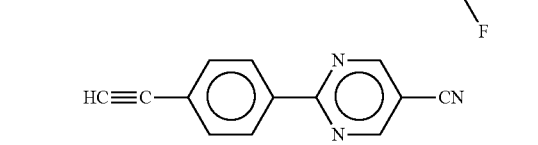

-continued

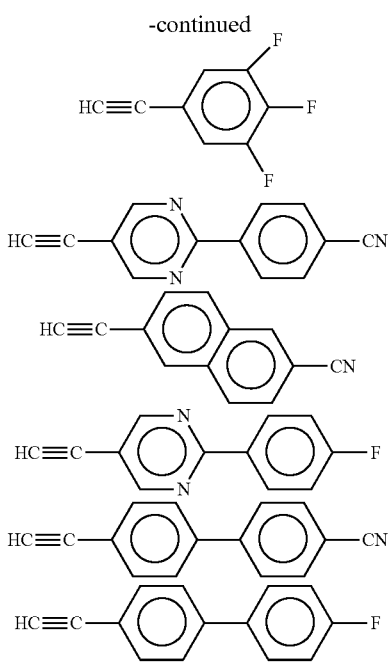

The polymer network 31 is preferably a cured product of a polymerizable liquid crystal compound. The polymer network 31 may define a matrix of three-dimensionally continuous fibers of the cured product, for example. The liquid crystal components 32 are phase-separated and dispersed within the polymer network 31.

In order to increase the transparency of the polymer dispersed liquid crystal layer 30 in the transparent state, preferably, the polymerizable liquid crystal compound defining the polymer network and the liquid crystal components have the same or similar abnormal light refractive index ne and the same or similar normal light refractive index no, with no voltage applied. For example, the difference in abnormal light refractive index ne and the difference in normal light refractive index no between the polymerizable liquid crystal compound and the liquid crystal components preferably satisfy Δno, Δne≤0.02, more preferably Δno, Δne≤0.01.

Preferably, the polymerizable liquid crystal compound exhibits a liquid crystal phase at room temperature to form a miscible blend with the liquid crystal components, and is phase-separated from the liquid crystal components after it is cured to form a polymer network. The polymerizable liquid crystal compound may be a photopolymerizable liquid crystal compound curable by ultraviolet light.

Examples of the photopolymerizable liquid crystal compound include monomers having a substituent such as a biphenyl group, a terphenyl group, a naphthalene group, a phenylbenzoate group, an azobenzene group, or a derivative of any of these groups (hereinafter, they are also referred to as mesogen groups); a photoreactive group such as a cinnamoyl group, a chalcone group, a cinnamylidene group, a β-(2-phenyl)acryloyl group, or a derivative of any of these groups; and a polymerizable group such as an acrylate, methacrylate, maleimide, N-phenylmaleimide, or siloxane group. The polymerizable group is preferably an acrylate group. The number of polymerizable groups per molecule of the photopolymerizable liquid crystal compound is not limited, but is preferably 1 or 2. The liquid crystal components may not have a polymerizable group such as an acrylate, methacrylate, maleimide, N-phenyl maleimide, or siloxane group.

The polymer dispersed liquid crystal layer 30 preferably has a polymerizable liquid crystal compound content of 5 wt % or more and 10 wt % or less relative to the weight of the liquid crystal components.

The polymer dispersed liquid crystal layer 30 may contain a polymerization initiator. The polymer dispersed liquid crystal layer 30 preferably has a polymerization initiator content of 5 wt % or more and 10 wt % or less relative to the weight of the polymerizable liquid crystal compound.

The polymerization initiator may be any conventionally known one, such as Omnirad 184® (available from IGM Resins. B.V.) represented by the following chemical formula (IN1) and OXE03 (available from BASF SE) represented by the following chemical formula (IN2).

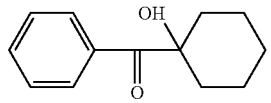
(IN1)

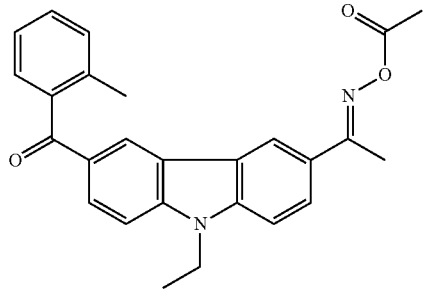
(IN2)

The polymer dispersed liquid crystal layer 30 may contain a chiral agent. When the polymer dispersed liquid crystal layer 30 contains a chiral agent, the chiral agent is preferably contained in part of the surface of the liquid crystal panel 1, not the entire surface of the liquid crystal panel 1.

The polymer dispersed liquid crystal layer 30 preferably has a chiral agent content of 0.5 wt % or more and 4 wt % or less relative to the sum of the weights of the liquid crystal components, the polymerizable liquid crystal compound, and the polymerization initiator.

The chiral agent may be any conventionally known one. The chiral agent can be, for example, CM-51L (available from JNC Corporation) or S-811 (available from Merck KGaA) represented by the following chemical formula (C1).

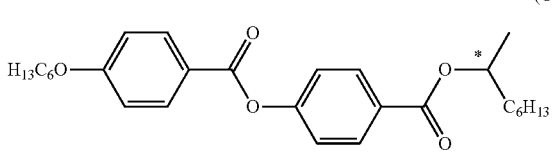
(C1)

Figure 3:
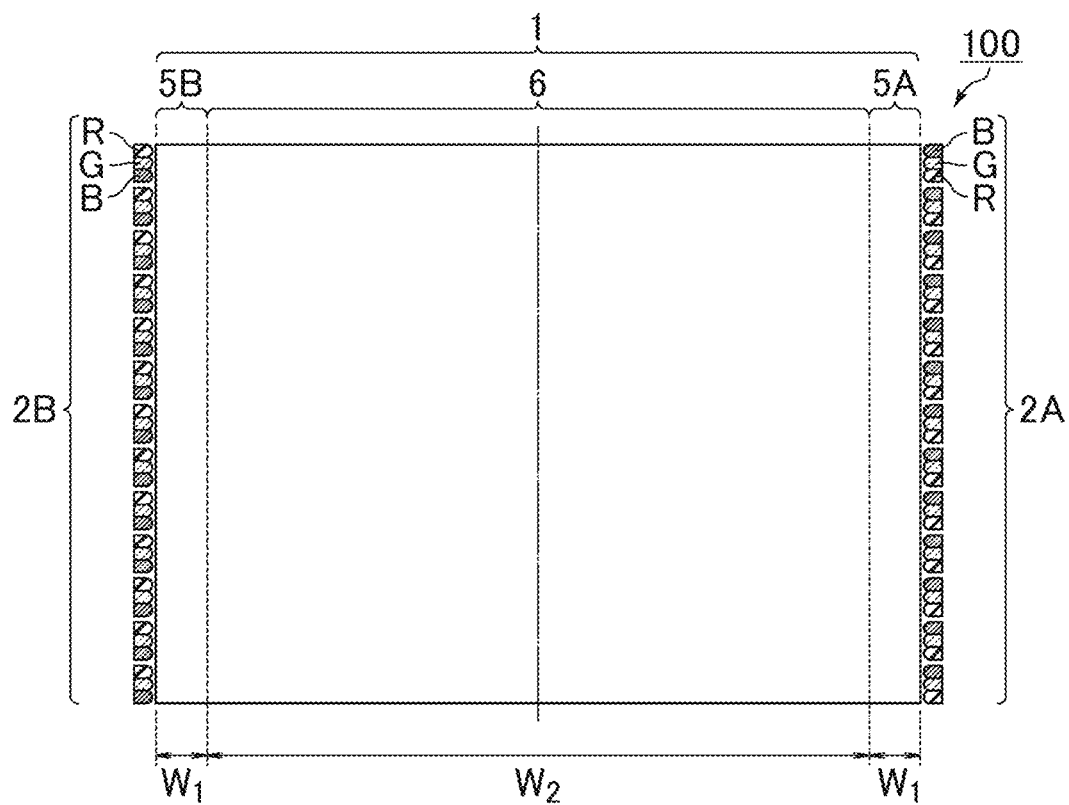
FIG. 3 is a schematic plan view of the display device in FIG. 1.

FIG. 3 is a schematic plan view of the display device in FIG. 1. The polymer dispersed liquid crystal layer includes, in a plan view, an end portion 5 closer to the light source and a central portion 6 farther from the light source than the end portion is. In FIG. 3, the region closer to a first light source 2A is a first end portion 5A and the region closer to a second light source 2B is a second end portion 5B. In other words, in FIG. 3, the central portion 6 is present between the two end portions (first end portion 5A and second end portion 5B). Herein, the first end portion 5A and the second end portion 5B each are simply referred to as the end portion 5 when no distinction is made therebetween.

The end portion 5 and the central portion 6 each have, in the scattering state, an angle dependence which changes the transmittance of light to be emitted from the front surface based on the angle at which light is incident on the back surface of the polymer dispersed liquid crystal layer 30, with the angle dependence of the end portion 5 being different from the angle dependence of the central portion 6. The "transmittance of light to be emitted from the front surface" is a parallel light transmittance of the liquid crystal panel at a light acceptance angle of about 3°, and is hereinafter also referred to as a "front transmittance". A higher front transmittance indicates a higher degree of scattering in the liquid crystal panel 1 as viewed from the front (as observed by the viewer), thus meaning that the luminance of the liquid crystal panel 1 in the scattering state is high.

The angle dependence is the property which, in the scattering state, changes the transmittance of light to be emitted from the front surface based on the angle at which light is incident on the back surface of the polymer dispersed liquid crystal layer 30. With different angle dependences of the end portion 5 and the central portion 6, more uniform front characteristics (high contrast ratio and high luminance) can be achieved in the plane of the liquid crystal panel 1. The front scattering characteristics in the transparent state do not depend on the type of the polymer dispersed liquid crystal layer and are almost changeless regardless of the angle of incidence of light. Thus, the polymer dispersed liquid crystal layer having multiple structures can increase the contrast ratio as well as the luminance.

(Examination of Angle Dependence of Polymer Dispersed Liquid Crystal Layer)

Figure 4:
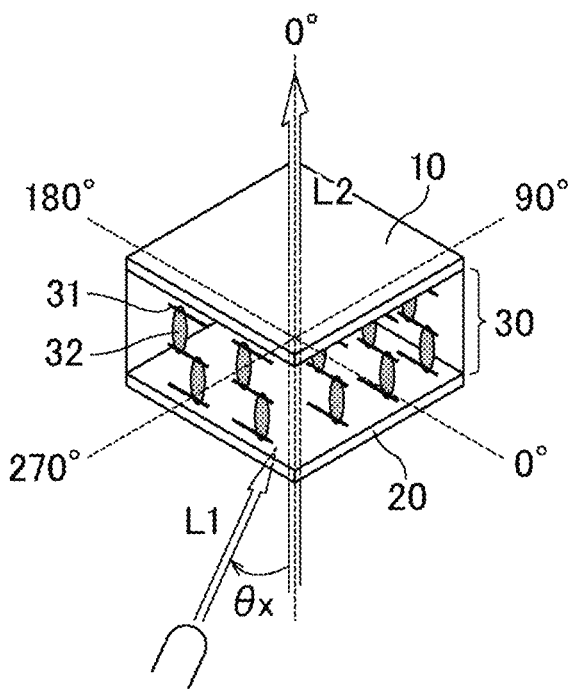
FIG. 4 is a perspective view showing a method of measuring the front transmittance of a polymer dispersed liquid crystal layer.
Figure 5:
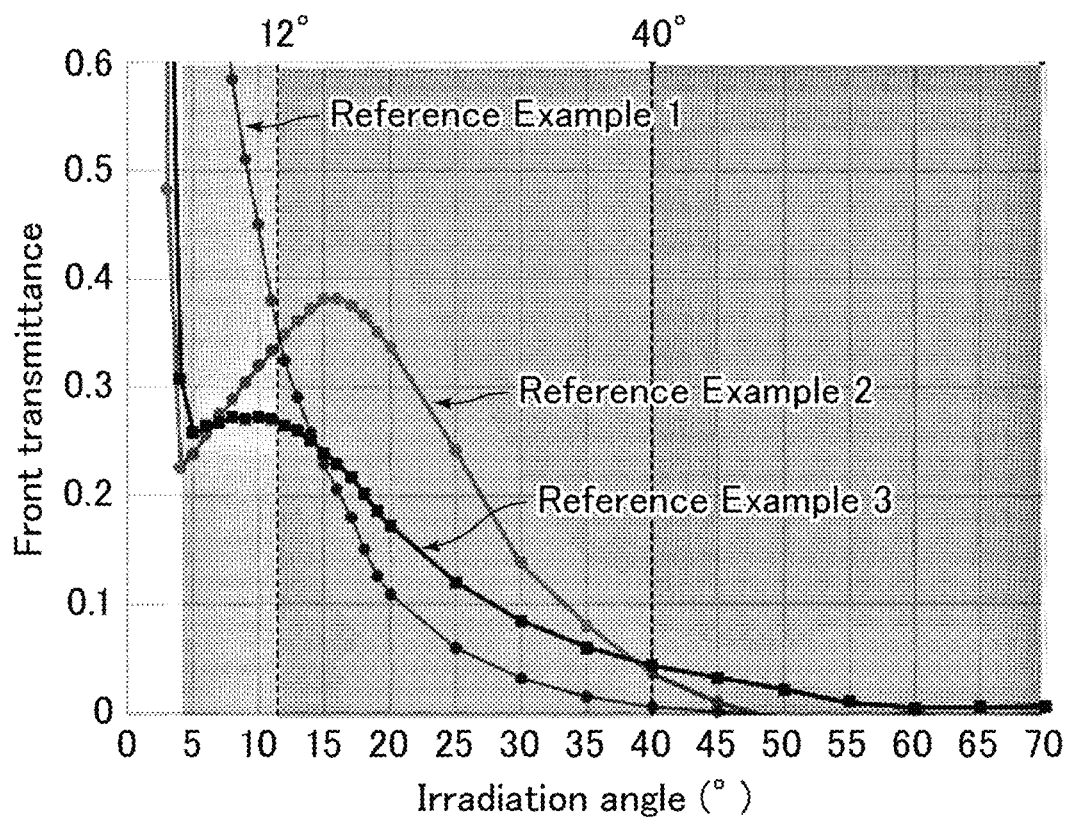
FIG. 5 is a graph of angle dependence of polymer dispersed liquid crystal layers.

The angle dependence of the polymer dispersed liquid crystal layer is described below with reference to FIG. 4 and FIG. 5. FIG. 4 is a perspective view showing a method of measuring the front transmittance of a polymer dispersed liquid crystal layer. FIG. 5 is a graph of angle dependence of polymer dispersed liquid crystal layers. In FIG. 5, the horizontal axis shows the irradiation angle)(° and the vertical axis shows the front transmittance.

The present inventors produced a liquid crystal cell that consists of a polymer dispersed liquid crystal layer having a single structure and having a certain angle dependence to examine the angle dependence of the polymer dispersed liquid crystal layer. The liquid crystal cell for examination was, as shown in FIG. 4, a liquid crystal cell including the polymer dispersed liquid crystal layer 30 containing the polymer network 31 and the liquid crystal components 32, and the substrates 10 and 20 holding the polymer dispersed liquid crystal layer 30 in between. Although not shown, the substrates 10 and 20 each had a structure including a planar electrode and an alignment film disposed closer to the polymer dispersed liquid crystal layer 30.

As shown in FIG. 4, in the examination, a predetermined angle θx was defined at an azimuth of 180° from the direction normal to the liquid crystal cell. The liquid crystal cell was irradiated with light L1 at the angle θx from its back surface. Light L2 emitted from the front surface of the liquid crystal cell was measured to determine the front transmittance. The angle θx is also referred to as an irradiation angle. When the liquid crystal components 32 in the scattering state are aligned in the thickness direction of the polymer dispersed liquid crystal layer 30, i.e., vertically to the surfaces of the substrates 10 and 20, the irradiation angle θx is also regarded as an angle formed by the alignment direction of the liquid crystal components and the irradiation direction of the light.

Liquid crystal cells of the following Reference Examples 1 to 3 were produced to examine the relationship between the irradiation angle and the front transmittance of each cell by the method above. The polymer dispersed liquid crystal layer in Reference Example 1 contains a polymer network, liquid crystal components having an anisotropy of refractive index Δn of 0.14, and a chiral agent. The polymer dispersed liquid crystal layer in Reference Example 2 contains a polymer network and liquid crystal components having an anisotropy of refractive index Δn of 0.14, without any chiral agent. The polymer dispersed liquid crystal layer in Reference Example 3 contains a polymer network and liquid crystal components having an anisotropy of refractive index Δn of 0.18, without any chiral agent.

As shown in FIG. 5, Reference Example 1 achieved the highest degree of scattering toward the front in an irradiation angle range of about 4° to 12°. Reference Example 2 achieved the highest degree of scattering toward the front in an irradiation angle range of about 12° to 40°. Reference Example 3 achieved the highest degree of scattering toward the front in an irradiation angle range of about 40° or greater. These results show that a polymer dispersed liquid crystal layer having multiple structures can increase the luminance (brightness) of the entire liquid crystal panel surface and improve the scattering characteristics in the case of observation from the front (front scattering characteristics) in the scattering state, as compared with a polymer dispersed liquid crystal layer having a single structure.

The end portion 5 has a high luminance as it is closer to the light source, and the irradiation angle of light incident on the end portion 5 is small. In contrast, the central portion 6, which is farther from the light source, has a lower luminance than the end portion. Also, the irradiation angle of light incident on the central portion 6 is greater than that of light incident on the end portion 5. Thus, preferably, a PDLC material achieving a high front transmittance at small irradiation angles is used for the end portion 5 and a PDLC material achieving a high front transmittance at large irradiation angles is used for the central portion 6. As shown in FIG. 5, from another viewpoint, such materials with different angle dependences are those whose lines representing front transmittances intersect each other at some point over the progression of the irradiation angle.

The method of imparting different angle dependences to the end portion 5 and the central portion 6 based on the examination above can be following method (i) or (ii), for example. Methods other than the methods based on the examination above include the following methods (iii) to (v). The following method (ii) may be combined with the following method (i) or (iii). The following method (v) may be combined with any of the following methods (i) to (iv).

(i) Preferably, the polymer dispersed liquid crystal layer 30 contains a chiral agent in the end portion 5 and contains no chiral agent in the central portion 6. For example, the structure in Reference Example 1 used in the examination above may be used for the end portion 5 and the structure in Reference Example 2 may be used for the central portion 6.

(ii) Preferably, the liquid crystal components in the central portion 6 have a higher anisotropy of refractive index than the liquid crystal components in the end portion 5. For example, the structure in Reference Example 2 used in the examination above may be used for the end portion 5 and the structure in Reference Example 3 may be used for the central portion 6.

(iii) Preferably, with no voltage applied, the twist angle of the liquid crystal components in the end portion 5 is greater than the twist angle of the liquid crystal components in the central portion 6. The twist angle is an angle formed by the alignment azimuth of the liquid crystal components present near one of the substrates and the alignment azimuth of the liquid crystal components present near the other of the substrates when the liquid crystal panel 1 is observed from the direction normal to the liquid crystal panel 1. With different alignment treatment directions for the alignment film 13 and the alignment film 23, the alignment azimuths of the liquid crystal components can be made different.

The twist angle is preferably 70° or greater and 90° or smaller. More preferably, the lower limit is 80°.

(iv) Preferably, the polymer dispersed liquid crystal layer 30 contains a chiral agent in both the central portion 6 and the end portion 5 and has a greater thickness in the end portion 5 than in the central portion 6.

Since a chiral gent is contained in both the end portion 5 and the central portion 6, the polymer network and the liquid crystal components are twisted at a certain pitch in each of the end portion 5 and the central portion 6. In the end portion 5 which is thicker, the polymer network and the liquid crystal components are more twisted than those in the central portion 6 which is thinner. Thus, in the scattering state, light is emitted also from the front in the central portion 6 due to diffusion and scattering of light, while light is not much emitted from the front in the end portion 5 due to higher degrees of diffusion and scattering also in directions other than the front than in the central portion. The central portion 6 therefore shows a higher degree of scattering toward the front than the end portion 5.

The thickness of the polymer dispersed liquid crystal layer 30 can be made greater in the end portion 5 than in the central portion 6 by, for example, forming an overcoat layer using a material such as a resin in the portion corresponding to the central portion 6 on the electrode 12 of the substrate 10 and/or the electrode 22 of the substrate 20. As for spacers used to support the polymer dispersed liquid crystal layer 30, the spacer(s) in the end portion 5 is/are preferably higher than the spacer(s) in the central portion 6. Spacers of two different heights may be used in the respective two regions of the central portion 6 and the end portion 5. Yet, more preferably, spacers of different three or more heights are used to form three or more regions such that the thickness of the polymer dispersed liquid crystal layer 30 gradually increases from the central portion toward the end portion.

Preferably, the difference in thickness between the end portion 5 and the central portion 6 of the polymer dispersed liquid crystal layer 30 is 2 µm or more. The upper limit of the difference is not limited, but is 8 µm, for example. Specifically, the polymer dispersed liquid crystal layer 30 may have a thickness of 3 µm in the central portion 6 and a thickness of 10 µm in the end portion 5.

(v) Preferably, the polymer dispersed liquid crystal layer 30 has a higher density of the polymer network in the central portion 6 than in the end portion 5. The density of the network can be adjusted by the concentration of the polymerizable compound relative to the weight of the liquid crystal components. Assuming that all the polymerizable compound monomers react to ultraviolet irradiation, the density of the network is approximate to the concentration of the polymerizable compound.

A method of increasing the density of the polymer network in the central portion 6 of the polymer dispersed liquid crystal layer 30 may be, for example, making the polymerizable compound content and/or the polymerization initiator content higher in the central portion 6 of the polymer dispersed liquid crystal layer 30 than in the end portion 5 of the polymer dispersed liquid crystal layer 30. For example, preferably, (the polymerization initiator content in the central portion 6):(the polymerization initiator content in the end portion 5)=(2 to 5 wt % relative to the polymerizable compound):(5 to 10 wt % relative to the polymerizable compound).

Another method may be, for example, increasing the ultraviolet light dose or intensity for the central portion 6 as compared with the ultraviolet light dose or intensity for the end portion 5 in formation of the polymer network. The method of applying ultraviolet light may be, for example, subjecting the end portion 5 and the central portion 6 to the first ultraviolet light irradiation, and then subjecting only the central portion 6 to the second ultraviolet light irradiation with a mask on the end portion 5. Also, with a half-tone mask on the end portion 5, the ultraviolet light dose or intensity can be made higher for the central portion 6 than for the end portion 5 by one-time ultraviolet light irradiation.

The methods (i), (ii) and (v) for varying the polymerizable compound content and/or the polymerization initiator content between the end portion 5 and the central portion 6 may be performed by a method of partitioning between the end portion 5 and the central portion 6 with a partition wall. The partition wall may be formed by, for example, providing a linear rib projection or aligning spacers with a high density as a substitution for the rib projection. The rib projection can be formed using an organic resin such as acrylic resin, polyimide, polyimideamide, or epoxy, or an inorganic insulating material such as silicon oxide, silicon nitride, or silicon oxynitride. Other methods include, for example, a method of dropping different liquid crystal materials on the regions corresponding to the end portion 5 and the central portion 6 on one of the substrates, and attaching the one substrate and the other substrate together (hereinafter, also referred to as the ODF process).

The width of the end portion (one end portion) 5 and the width of the central portion 6 in the direction perpendicular to the side at which the light source 2 is disposed are respectively defined as W1 and W2. In this case, preferably, the ratio of W1 to W2 is 1:3 to 1:10. The W1 may be, for example, 3 cm or greater and 10 cm or smaller. The W2 may be, for example, 20 cm or greater and 30 cm or smaller.

In the case of providing a partition wall, each of the end portion 5 and the central portion 6 is defined by a sealant or a partition wall, and the width W1 of the end portion 5 is the distance from the side at which the light source 2 is disposed to the partition wall, and the width W2 of the central portion 6 is the distance between the partition walls defining the central portion 6. In the case of the method (iii), the end portion 5 and the central portion 6 can be defined by performing the alignment treatment for an alignment film in different directions, and the width W1 of the end portion 5 and the width W2 of the central portion 6 can be set by determining the alignment azimuth of the liquid crystal components with no voltage applied. In the case of the method (iv), the width W1 of the end portion 5 and the width W2 of the central portion 6 can be determined by measuring the thickness of the polymer dispersed liquid crystal layer 30.

The case of dividing the polymer dispersed liquid crystal layer 30 into two regions, i.e., the central portion and the end portion, has been described. Yet, there may be additional region(s). For example, a structure may be possible which includes an end portion, a middle region, a central portion, a middle region, and an end portion.

The light source is apart from the liquid crystal panel with an air layer 4 in between. Some conventional display devices use an edge-lit backlight with a light guide plate or use an optical clear adhesive (OCA) to attach the liquid crystal panel and the light guide plate together. Light applied to a side surface of the light guide plate from the horizontal direction is reflected inside the light guide plate and emitted toward the liquid crystal panel. The light, however, is sometimes lost when reflected inside the light guide plate or when passing through the OCA, causing a low luminance of the display device. The display device of the present embodiment, including the light source apart from the liquid crystal panel with the air layer 4 in between, causes no loss of light when the light is reflected inside the light guide plate or when passing through the OCA unlike the conventional display devices, thus achieving a high luminance. The display device therefore can achieve a high contrast ratio and a high luminance even with a display screen having a large area.

The distance (thickness of the air layer) H from the light source to the back surface of the liquid crystal panel is appropriately selected according to the size of the display device, and is 1 cm or greater and 15 cm or smaller, for example.

The light source emits light toward the liquid crystal panel from an oblique direction. This mode can reduce light attenuation and achieve a high luminance (specifically, front luminance) near the center of the liquid crystal panel, as compared with the case of applying light from the light source to a side surface of the conventional light guide plate or the case of applying light to the side surface of the light modulation layer as in JP 2016-85452 A. Thus, the display device can achieve a high contrast ratio and a high luminance even with a display screen having a large area.

Applying light to the liquid crystal panel from an oblique direction means that light emitted from the light source is not parallel to the surfaces of the liquid crystal panel. The direction in which the main surface of the light source faces is appropriately selected according to the size of the display panel and the type of the liquid crystal material used, and is at 30° or greater and 80° or smaller from the direction normal to the liquid crystal panel which is taken as 0°.

The light source 2 extends along at least one outer edge of the liquid crystal panel. As shown in FIG. 3, a first light source 2A and a second light source 2B may extend along the respective two opposite short sides of the liquid crystal panel. Herein, the first light source 2A and the second light source 2B each are simply referred to as the light source 2 when no distinction is made therebetween. Preferably, the light source 2 in a plan view applies light toward the bisector of an outer edge different from the outer edge along which the light source 2 extends. When the first light source 2A and the second light source 2B extend along the respective opposite short sides of the liquid crystal panel, the first light source 2A and the second light source 2B in a plan view preferably apply light toward the bisector of the long side of the liquid crystal panel represented by the dashed and dotted line in FIG. 1 to FIG. 3.

The light source applies light to the end portion and the central portion at different angles. As shown in FIG. 1, when the direction normal to the liquid crystal panel 1 is 0° and the outer edge along which the light source 2 extends is a short side of the liquid crystal panel, an angle $\theta 1$ of light incident on the central portion (hereinafter, also referred to as an irradiation angle for the central portion) is an angle formed by light applied toward the bisector of the long side of the liquid crystal panel and the 0° direction. Also, an angle $\theta 2$ of light incident on the end portion (hereinafter, also referred to as an irradiation angle for the end portion) is an angle formed by light applied toward the edge of the end portion 5 farthest from the light source and the 0° direction. When the end portion and the central portion are adjacent to each other, the angle formed by light applied toward the boundary between the end portion and the central portion and the 0° direction corresponds to the irradiation angle $\theta 2$ for the end portion.

Preferably, the irradiation angle $\theta 1$ for the central portion is greater than the irradiation angle $\theta 2$ for the end portion. The irradiation angle $\theta 1$ for the central portion may be, for example, 5° or greater and 20° or smaller. The irradiation angle $\theta 2$ for the end portion may be, for example, 30° or greater and 80° or smaller.

The light source may be of a single color or may include light-emitting elements of multiple colors. Examples of the light-emitting elements include light emitting diodes (LEDs). Preferably, the light-emitting elements emit light isotropically. The light-emitting elements of multiple colors may include, for example, light-emitting elements of red, green, and blue.

The light source may include light-emitting elements of multiple colors, and the light-emitting elements of multiple colors may be driven based on a field-sequential color system in which the light-emitting elements are turned on time-divisionally (hereinafter, such driving is also referred to as "FSC driving"). The FSC driving consecutively turns on the light-emitting elements of individual colors at staggered times to provide color display. The FSC-driven color display eliminates the need for color filters, thus enabling display devices with a reduced thickness. Such FSC driving also eliminates the need for polarizing plates, color filters, and a black matrix for partitioning color filters. This enables a display device having a higher luminance than a common liquid crystal display device including a planar backlight.

The display device 100 can be used as, for example, a television, digital signage, a shop window, lighting equipment, a dimmable panel, an amusement device, an information sign, or a mobile device.

EXAMPLES

The present invention is described in more detail based on examples. The present invention is not limited to the examples. Display devices of the following Examples 1 to 4 are reverse mode display devices driven based on a field-sequential color system.

Example 1

Figure 6:
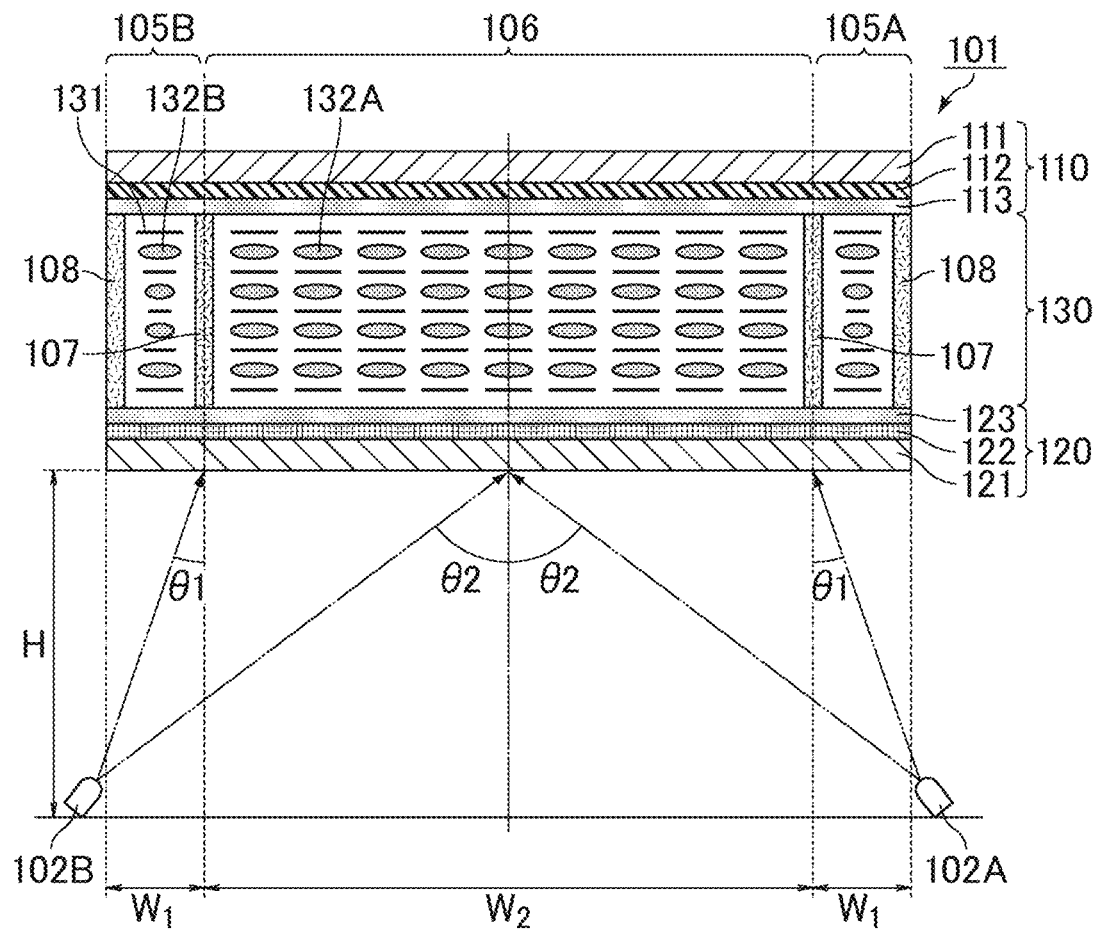
FIG. 6 is a schematic cross-sectional view showing a transparent state of a display device of Example 1.
Figure 7:
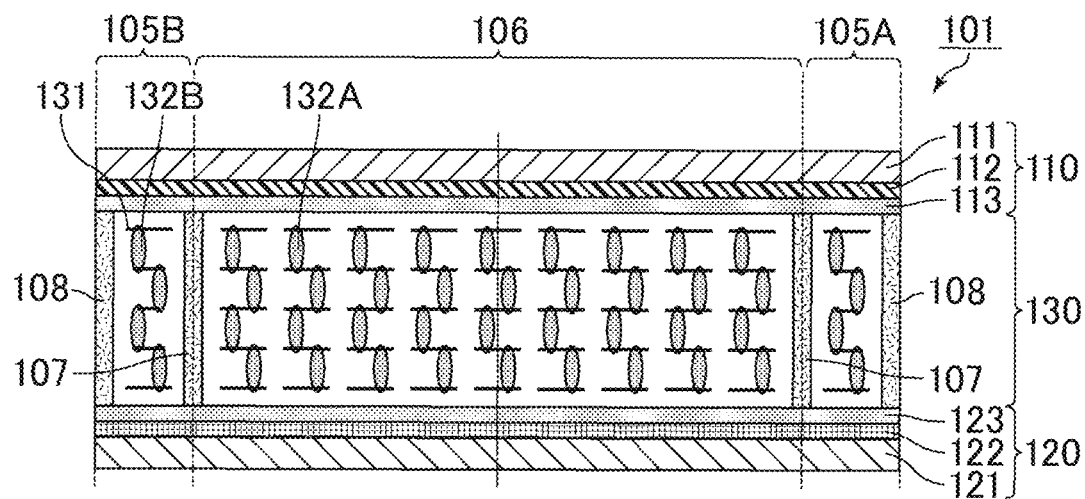
FIG. 7 is a schematic cross-sectional view showing a scattering state of the liquid crystal panel in FIG. 6.

Example 1 is a specific example of a display device produced by the methods (i) and (v) in combination. In other words, in the display device of Example 1, the polymer dispersed liquid crystal layer contains a chiral agent in the end portion and contains no chiral agent in the central portion, and has a higher density of the polymer network in the central portion than in the end portion. FIG. 6 is a schematic cross-sectional view showing the transparent state of the display device of Example 1. FIG. 7 is a schematic cross-sectional view showing the scattering state of the liquid crystal panel in FIG. 6.

In Example 1, a PDLC material containing a chiral agent and showing the highest degree of scattering toward the front in an irradiation angle range of about 4° to 12° was used for end portions (first end portion 105A and second end portion 105B) of a polymer dispersed liquid crystal layer 130 where the irradiation angle is smaller, while a PDLC material containing no chiral agent and showing the highest degree of scattering toward the front in an irradiation angle range of about 12° to 40° was used for a central portion 106 of the polymer dispersed liquid crystal layer 130 where the irradiation angle is greater.

The polymer dispersed liquid crystal (PDLC) material used for the first end portion 105A and the second end portion 105B contains liquid crystal components, a polymerizable compound, a polymerization initiator, and a chiral agent. The liquid crystal components had an anisotropy of refractive index Δn of 0.14, a positive anisotropy of dielectric constant Δε of 20 or less, and a rotational viscosity γ of 120 mPa·s. The polymerizable compound was one curable by ultraviolet irradiation, and was added such that the amount thereof was 5 wt % relative to the weight of the liquid crystal components. The polymerization initiator was added such that the amount thereof was 5 wt % relative to the weight of the polymerizable compound. The chiral agent was added such that the amount thereof was 4 wt % relative to the sum of the weights of the liquid crystal components, the polymerizable liquid crystal compound, and the polymerization initiator.

The PDLC material used for the central portion 106 contained no chiral agent but contained liquid crystal components, a polymerizable compound, and a polymerization initiator. The liquid crystal components had an anisotropy of refractive index Δn of 0.14, a positive anisotropy of dielectric constant Δε of 20 or less, and a rotational viscosity γ of 170 mPa·s. The polymerizable compound was the same as that used for the end portions, and was added such that the amount thereof was 9 wt % relative to the weight of the liquid crystal components. The polymerization initiator was added such that the amount thereof was 10 wt % relative to the weight of the polymerizable compound.

As shown in FIG. 6, a pair of glass base materials each having a length of about 30 cm and a width of about 40 cm was prepared as transparent base materials 111 and 121 and transparent planar electrodes (solid electrodes) were formed using ITO as electrodes 112 and 122 on the surfaces of the respective glass substrates. Alignment films 113 and 123 were formed on the surfaces of the electrodes 112 and 122, respectively, so that a pair of substrates 110 and 120 was produced. The alignment films 113 and 123 were produced by performing photoalignment treatment on photoalignment films to homogeneously align the liquid crystal components. Partition walls 107 were produced from the organic resin or inorganic insulating material described above in the boundary between the first end portion 105A and the central portion 106 and the boundary between the second end portion 105B and the central portion 106, on the alignment film 113 in the substrate 110. The PDLC materials each were dropped onto the first end portion 105A and the second end portion 105B or the central portion 106 by the ODF process, and the substrates 110 and 120 were attached together with a sealant 108, so that a liquid crystal cell was produced.

The central portion 106 of the resulting liquid crystal cell was irradiated with ultraviolet light (wavelength: 365 nm) with an intensity of 50 mW/cm² and a dose of 2 J/cm², while the first end portion 105A and the second end portion 105B were irradiated with ultraviolet light (wavelength: 365 nm) with an intensity of 5.5 mW/cm² and a dose of 2 J/cm². The ultraviolet irradiation cured the photopolymerizable compound, so that the polymer dispersed liquid crystal layer 130 was formed in which liquid crystal components 132A and 132B were dispersed in a polymer network 131. The polymer dispersed liquid crystal layer 130 had a thickness of 3 µm. Thus, a 19-inch liquid crystal panel 101 was completed. The first end portion 105A and the second end portion 105B shown in FIG. 6 each had a width W1 of about 2 cm, while the central portion 206 had a width of about 36 cm.

A light source was disposed apart from the back surface of the liquid crystal panel 101, and thus the display device of Example 1 was completed. The light source included, as shown in FIG. 2, a first light source 102A and a second light source 102B extending along the respective two opposite short sides of the liquid crystal panel. The first light source 102A and the second light source 102B each included LEDs of red (R), green (G), and blue (B). The distance (thickness of the air layer) H from each of the first light source 102A and the second light source 102B to the liquid crystal panel was about 5 cm. The angles θ1 and θ2 shown in FIG. 6 were respectively about 12° and about 63°. In other words, the angle of light applied from the first light source 102A to the first end portion 105A and the angle of light applied from the second light source 102B to the second end portion 105B each were 0° or greater and 12° or smaller. The angle of light from each of the first light source 102A and the second light source 102B to the central portion 106 was greater than 12° and 63° or smaller.

As shown in FIG. 6, in the transparent state with no voltage applied, the liquid crystal components 132B and the polymer network 131 in each of the first end portion 105A and the second end portion 105B were aligned horizontally to the surfaces of the substrates 110 and 120 and twisted at the same pitch. The liquid crystal components 132A and the polymer network 131 in the central portion 106 were aligned horizontally to the surfaces of the pair of substrates 110 and 120 and in the longitudinal direction of the substrates 110 and 120. In the transparent state, there was almost no difference in abnormal light refractive index ne and normal light refractive index no between the liquid crystal components 132B and the polymer network 131, so that the light emitted from the light source passed through the polymer dispersed liquid crystal layer 130 to provide a transparent state.

As shown in FIG. 7, when voltage is applied between the electrodes 112 and 122, a vertical electric field is generated in the thickness direction of the polymer dispersed liquid crystal layer 130, which raises the liquid crystal components 132A and 132B. In contrast, the alignment azimuth of the polymer network 131 does not change. This increases the difference in abnormal light refractive index ne and normal light refractive index no between the liquid crystal components 132A and 132B and the polymer network 131. Light emitted from the light source is therefore scattered by the polymer dispersed liquid crystal layer 130.

The display device of Example 1 in the scattering state achieved a front contrast ratio of 5 or more and a luminance of 100 cd/m² or higher in the central portion 106 of the liquid crystal panel 101, and a front contrast ratio of 5 or more and a luminance of 200 cd/m² or higher in the first end portion 105A and the second end portion 105B of the liquid crystal panel 101.

Example 2

Figure 8:
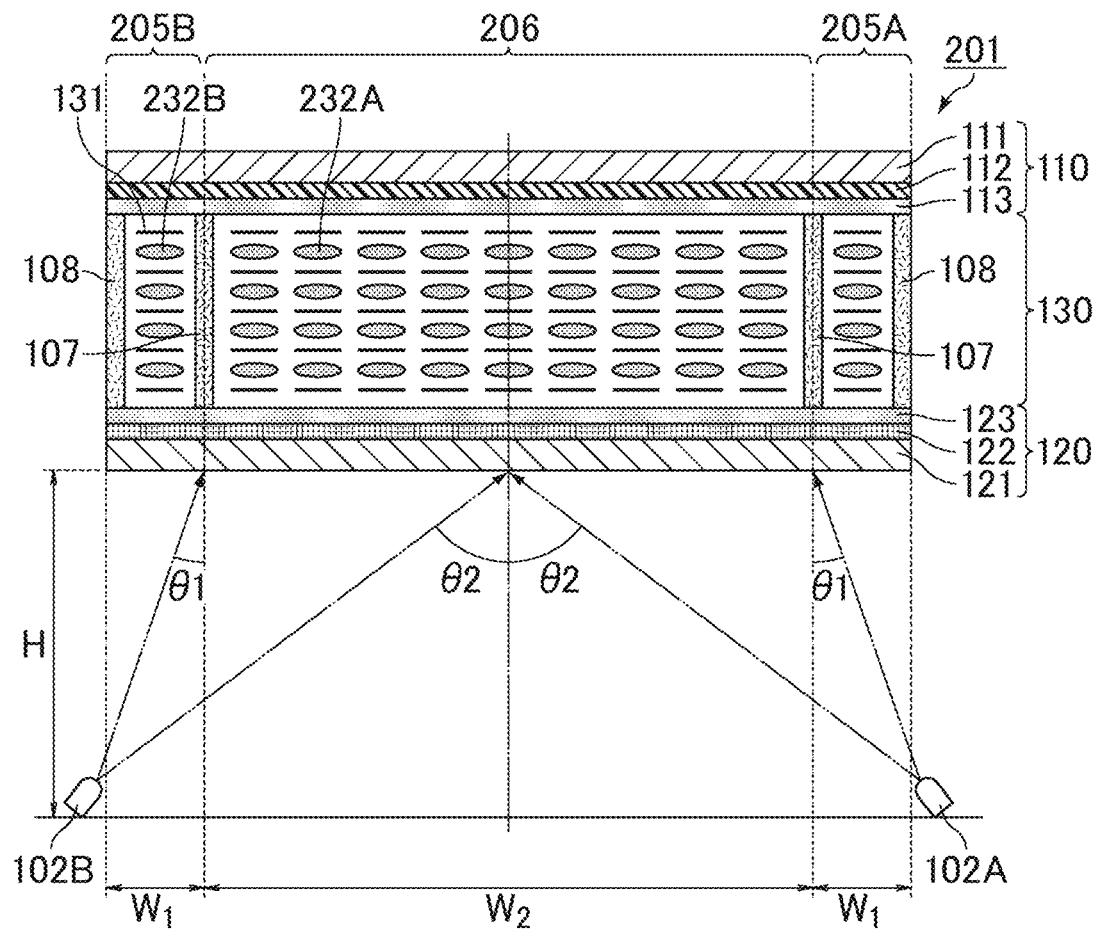
FIG. 8 is a schematic cross-sectional view showing a transparent state of a display device of Example 2.
Figure 9:
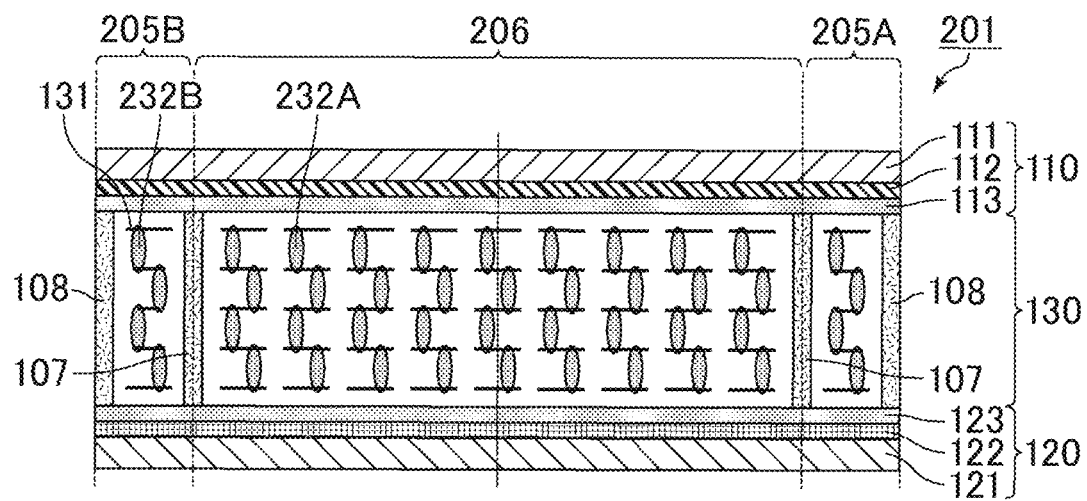
FIG. 9 is a schematic cross-sectional view showing a scattering state of the liquid crystal panel in FIG. 8.

Example 2 is a specific example of a display device produced by the method (ii). In other words, in the display device of Example 2, the liquid crystal components in the central portion had a higher anisotropy of refractive index than the liquid crystal components in the end portion. FIG. 8 is a schematic cross-sectional view showing the transparent state of the display device of Example 2. FIG. 9 is a schematic cross-sectional view showing the scattering state of the liquid crystal panel in FIG. 8.

In Example 2, a PDLC material containing liquid crystal components with a low anisotropy of refractive index Δn and showing the highest degree of scattering toward the front in an irradiation angle range of about 12° to 40° was used for the end portions (first end portion 205A and second end portion 205B) of the polymer dispersed liquid crystal layer 130 where the irradiation angle is smaller, while a PDLC material containing liquid crystal components with a high anisotropy of refractive index Δn and showing the highest degree of scattering toward the front in an irradiation angle range of about 40° or greater was used for a central portion 206 of the polymer dispersed liquid crystal layer 130 where the irradiation angle is greater.

The polymer dispersed liquid crystal (PDLC) material used for the first end portion 205A and the second end portion 205B contains no chiral agent but contains liquid crystal components, a polymerizable compound, and a polymerization initiator. The liquid crystal components, the polymerizable compound, and the polymerization initiator were the same as those used for the end portions in Example 1. The polymerizable compound was added such that the amount thereof was 9 wt % relative to the weight of the liquid crystal components. The polymerization initiator was added such that the amount thereof was 5 wt % relative to the weight of the polymerizable compound.

The polymer dispersed liquid crystal (PDLC) material used for the central portion 206 contains no chiral agent but contains liquid crystal components, a polymerizable compound, and a polymerization initiator. The liquid crystal components had an anisotropy of refractive index Δn of 0.18, a positive anisotropy of dielectric constant Δε of 20 or less, and a rotational viscosity γ of 170 mPa·s. The polymerizable compound and the polymerization initiator were the same as those used for the end portions in Example 1. The polymerizable compound was added such that the amount thereof was 9 wt % relative to the weight of the liquid crystal components. The polymerization initiator was added such that the amount thereof was 10 wt % relative to the weight of the polymerizable compound.

As in Example 1, the substrates 110 and 120 were produced, and the alignment treatment was performed on the alignment films 113 and 123. Then, as in Example 1, the partition walls 107 were produced in the boundary between the first end portion 205A and the central portion 206 and the boundary between the second end portion 205B and the central portion 206 on the alignment film 113. The PDLC materials each were dropped onto the first end portion 205A and the second end portion 205B or the central portion 206 by the ODF process, and the substrates 110 and 120 were attached together with the sealant 108, so that a liquid crystal cell was produced.

The central portion 206, the first end portion 205A, and the second end portion 205B of the resulting liquid crystal cell were irradiated with ultraviolet light (wavelength: 365 nm) with an intensity of 50 mW/cm$^2$ and a dose of 2 J/cm$^2$. The ultraviolet irradiation cured the photopolymerizable compound, so that the polymer dispersed liquid crystal layer 130 was formed in which liquid crystal components 232A and 232B were dispersed in the polymer network 131. The polymer dispersed liquid crystal layer 130 had a thickness of 3 μm. Thus, a 19-inch liquid crystal panel 201 was completed. The first end portion 205A and the second end portion 205B shown in FIG. 8 each had a width W1 of about 2 cm, while the central portion 206 had a width of about 36 cm.

A light source was disposed apart from the back surface of the liquid crystal panel 201, and thus the display device of Example 2 was completed. The distance (thickness of the air layer) H from each of the first light source 102A and the second light source 102B to the liquid crystal panel 201 was about 5 cm. The angles θ1 and θ2 shown in FIG. 8 were respectively about 40° and about 63°. In other words, the angle of light applied from the first light source 102A to the first end portion 205A and the angle of light applied from the second light source 102B to the second end portion 205B each were 0° or greater and 40° or smaller. The angle of light from each of the first light source 102A and the second light source 102B to the central portion 206 was greater than 40° and 63° or smaller.

As shown in FIG. 8, in the transparent state with no voltage applied, the liquid crystal components 232A and 232B and the polymer network 131 in each of the first end portion 205A and the second end portion 205B were aligned horizontally to the surfaces of the substrates 110 and 120 and in the longitudinal direction of the substrates 110 and 120. In the transparent state, there was almost no difference in abnormal light refractive index ne and normal light refractive index no between the liquid crystal components 232A and 232B and the polymer network 131, so that the light emitted from the light source passed through the polymer dispersed liquid crystal layer 130 to provide a transparent state.

As shown in FIG. 9, when voltage is applied between the electrodes 112 and 122, a vertical electric field is generated in the thickness direction of the polymer dispersed liquid crystal layer 130, which raises the liquid crystal components 232A and 232B. In contrast, the alignment azimuth of the polymer network 131 does not change. This increases the difference in abnormal light refractive index ne and normal light refractive index no between the liquid crystal components 232A and 232B and the polymer network 131. Light emitted from the light source is therefore scattered by the polymer dispersed liquid crystal layer 130.

The display device of Example 2 in the scattering state achieved a front contrast ratio of 7 or more and a luminance of 150 cd/m$^2$ or higher in the central portion 206 of the liquid crystal panel 201, and a front contrast ratio of 7 or more and a luminance of 300 cd/m$^2$ or higher in the first end portion 205A and the second end portion 205B of the liquid crystal panel 201. The display device of Example 2 achieved a higher front contrast ratio and a higher luminance especially in the end portions than the display device of Example 1.

The structures of Examples 1 and 2 may be combined, and a PDLC material containing no chiral agent and containing liquid crystal components with a higher anisotropy of refractive index than the liquid crystal components in the end portions of the polymer dispersed liquid crystal layer may be used for the central portion of the polymer dispersed liquid crystal layer, while a PDLC material containing a chiral agent and liquid crystal components with a lower anisotropy of refractive index than the liquid crystal components in the central portion of the polymer dispersed liquid crystal layer may be used for the end portions of the polymer dispersed liquid crystal layer.

Example 3

Figure 10:
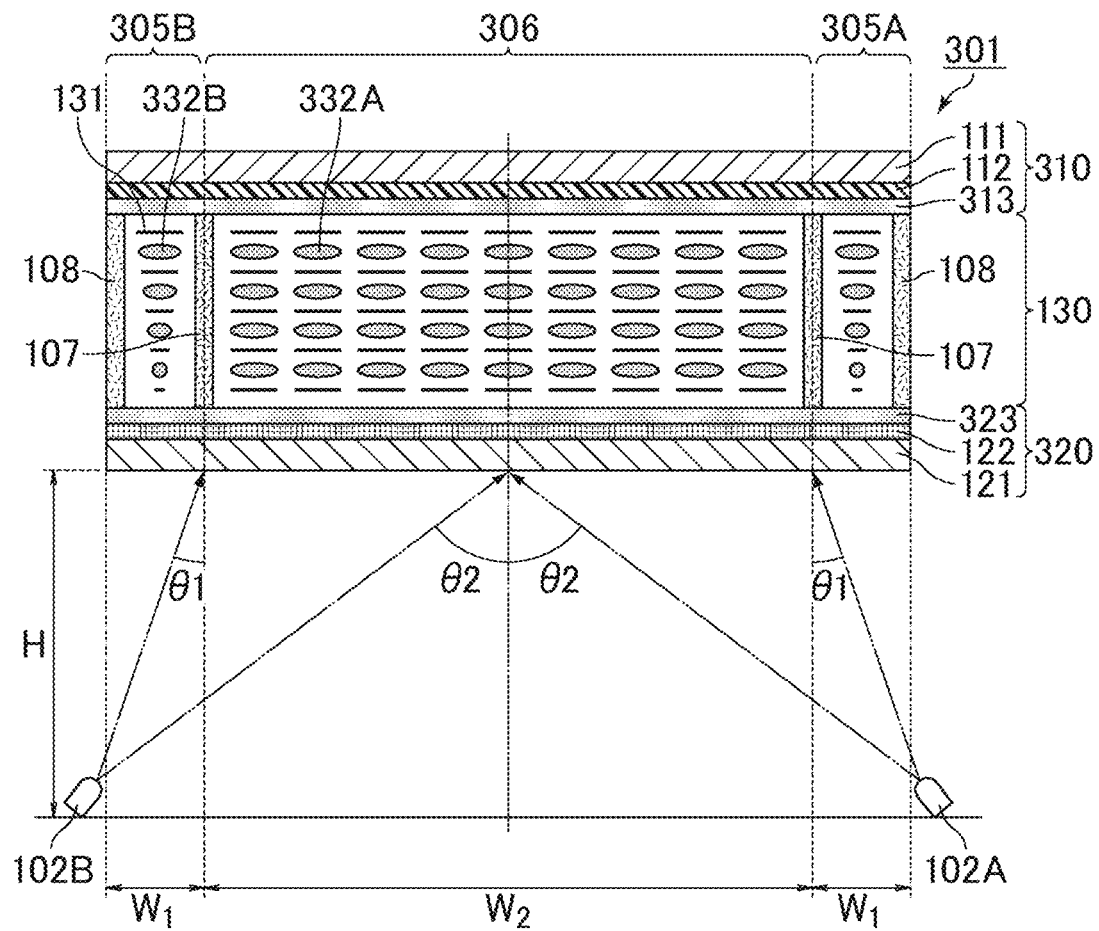
FIG. 10 is a schematic cross-sectional view showing a transparent state of a display device of Example 3.
Figure 11:
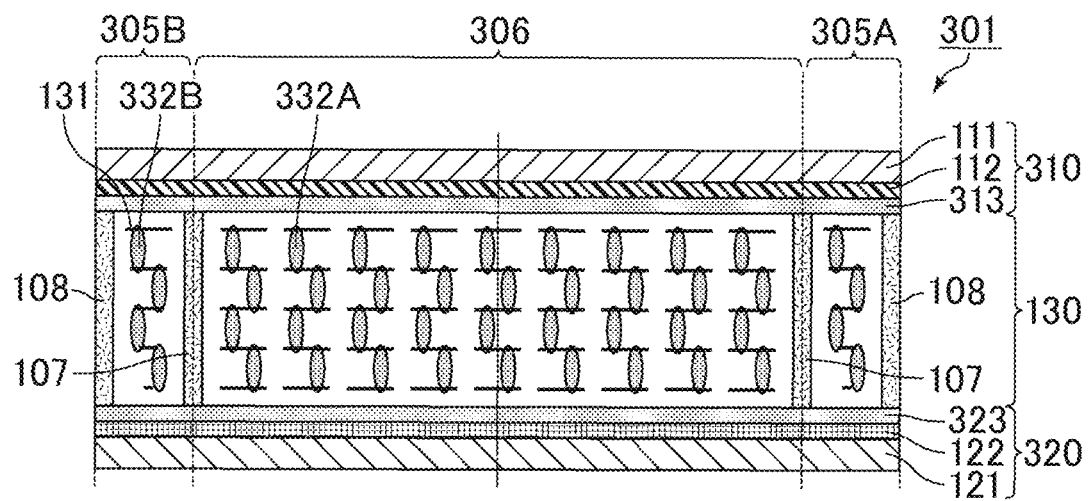
FIG. 11 is a schematic cross-sectional view showing a scattering state of the liquid crystal panel in FIG. 10.

Example 3 is a specific example of a display device produced by the method (iii). In other words, in the display device of Example 3, with no voltage applied, the twist angle of the liquid crystal components in the end portion is greater than the twist angle of the liquid crystal components in the central portion. FIG. 10 is a schematic cross-sectional view showing the transparent state of the display device of Example 3. FIG. 11 is a schematic cross-sectional view showing the scattering state of the liquid crystal panel in FIG. 10.

In Example 3, a PDLC material containing liquid crystal components with a low anisotropy of refractive index Δn and showing the highest degree of scattering toward the front in an irradiation angle range of about 12° to 40° was used for the end portions (first end portion 305A and second end portion 305B) of the polymer dispersed liquid crystal layer 130 where the irradiation angle is smaller, while a PDLC material containing liquid crystal components with a high anisotropy of refractive index Δn and showing the highest degree of scattering toward the front in an irradiation angle range of about 40° or greater was used for a central portion 306 of the polymer dispersed liquid crystal layer 130 where the irradiation angle is greater.

The polymer dispersed liquid crystal (PDLC) material used for the first end portion 305A, the second end portion 305B, and the central portion 306 contains no chiral agent but contains liquid crystal components, a polymerizable compound, and a polymerization initiator. In other words, a liquid crystal material 323A in the central portion 306 and the liquid crystal material 323B in the first end portion 305A and the second end portion 305B are the same liquid crystal material. The liquid crystal components, the polymerizable compound, and the polymerization initiator were the same as those used for the end portions in Example 1. The amounts of the polymerizable compound and the polymerization initiator were the same as those for the end portions in Example 1.

As in Example 1, a pair of substrates 310 and 320 was produced by forming the electrodes 112 and 122 on the surfaces of the respective glass base materials and forming alignment films 313 and 323 on the surfaces of the respective electrodes 112 and 122. The alignment films 313 and 323 are photoalignment films.

Figure 12A:
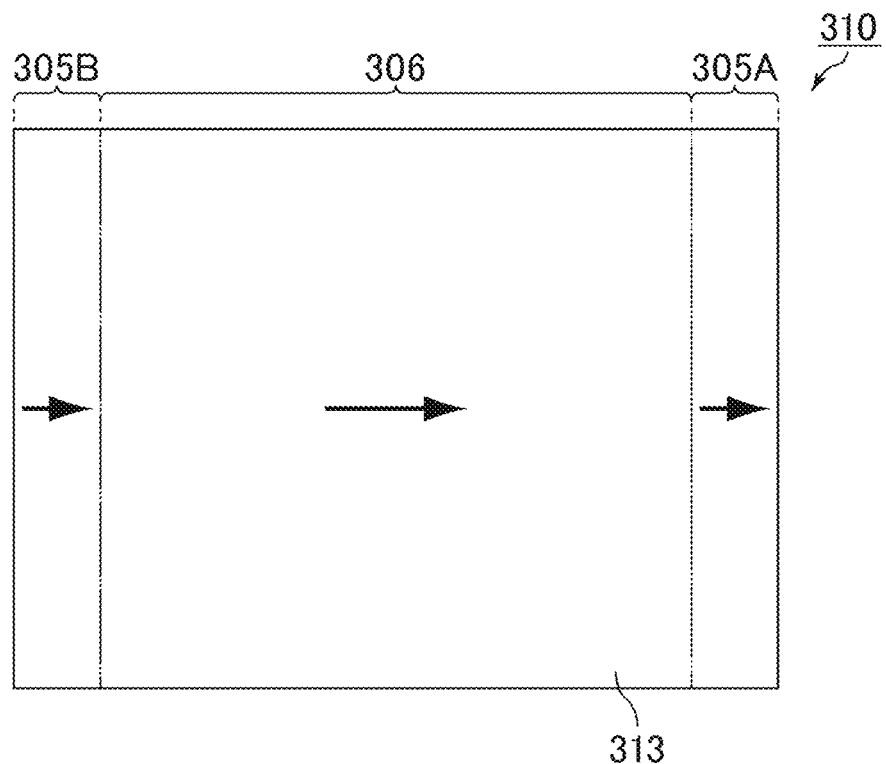
FIG. 12A is a schematic plan view showing the alignment treatment method for one of the substrates used in Example 3.
Figure 12B:
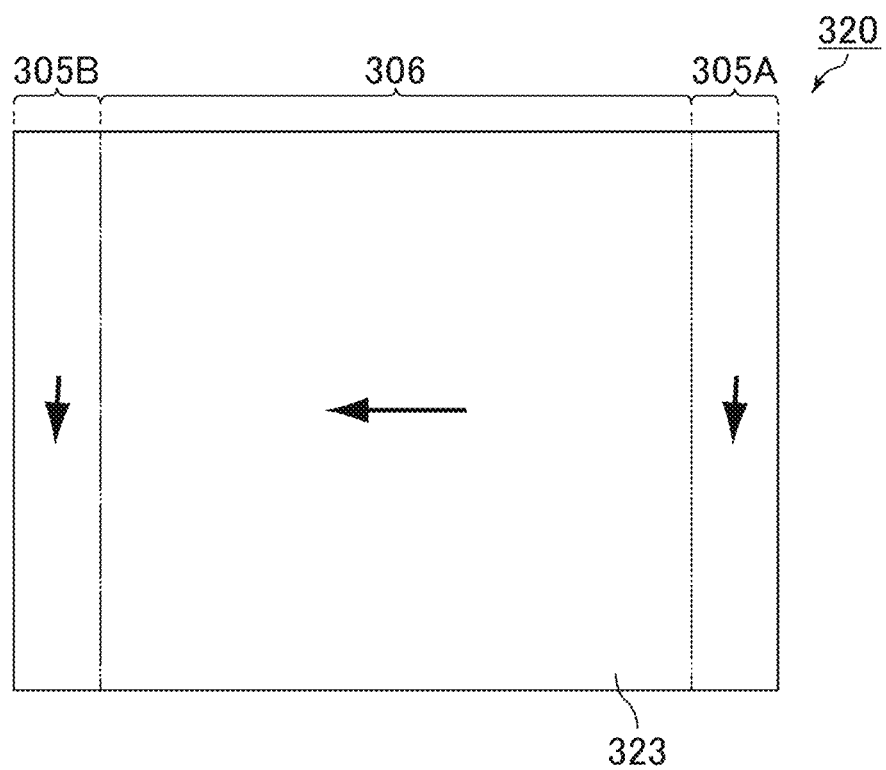
FIG. 12B is a schematic plan view showing the alignment treatment method for the other of the substrates used in Example 3.

The alignment treatment directions for the alignment films in Example 3 are described below with reference to FIGS. 12A and 12B. FIG. 12A is a schematic plan view showing the alignment treatment method for one of the substrates used in Example 3. FIG. 12B is a schematic plan view showing the alignment treatment method for the other of the substrates used in Example 3. FIG. 12A is a schematic plan view of the substrate 310 as viewed from the alignment film 313 side. FIG. 12B is a schematic plan view of the substrate 320 as viewed from the alignment film 323 side. In FIG. 12A and FIG. 12B, the arrows show the alignment treatment directions.

As shown in FIG. 12A, photoalignment treatment (ultraviolet light irradiation) was performed in the same direction for the regions of the alignment film 313 on the substrate 310 corresponding to the first end portion 305A, the second end portion 305B, and the central portion 306. Specifically, the photoalignment treatment was performed in the direction parallel to the longitudinal direction of the substrate 310.

As shown in FIG. 12B, photoalignment treatment was performed for the region of the alignment film 323 on the substrate 320 corresponding to the central portion 306, in the direction parallel to and reverse from the alignment treatment direction for the region of the alignment film 313 corresponding to the central portion 306. Also, photoalignment treatment was performed for the regions of the alignment film 323 corresponding to the first end portion 305A and the second end portion 305B, at an azimuth forming an angle of 89° with the alignment treatment direction for the regions of the alignment film 313 corresponding to the first end portion 305A and the second end portion 305B.

The PDLC materials were dropped onto the alignment film 313 in the substrate 310, and the substrates 310 and 320 were attached together using the sealant 108 with the alignment films 313 and 323 facing each other, so that a liquid crystal cell was produced. The central portion 306, the first end portion 305A, and the second end portion 305B of the resulting liquid crystal cell were irradiated with ultraviolet light (wavelength: 365 nm) with an intensity of 50 mW/cm$^2$ and a dose of 2 J/cm$^2$. The ultraviolet irradiation cured the photopolymerizable compound, so that the polymer dispersed liquid crystal layer 130 was formed in which liquid crystal components 332A and 332B were dispersed in the polymer network 131. The polymer dispersed liquid crystal layer 130 had a thickness of 3 μm. Thus, a 19-inch liquid crystal panel 301 was completed. The first end portion 305A and the second end portion 305B shown in FIG. 10 each had a width W1 of about 2 cm, while the central portion 306 had a width of about 36 cm.

The same light source as in Example 1 was disposed apart from the back surface of the liquid crystal panel 301, and thus the display device of Example 3 was completed. The distance (thickness of the air layer) H from each of the first light source 102A and the second light source 102B to the liquid crystal panel 301 was about 5 cm. The angles θ1 and θ2 shown in FIG. 10 were respectively about 12° and about 63°. In other words, the angle of light applied from the first light source 102A to the first end portion 305A and the angle of light applied from the second light source 102B to the second end portion 305B each were 0° or greater and 12° or smaller. The angle of light from each of the first light source 102A and the second light source 102B to the central portion 306 was greater than 12° and 63° or smaller.

As shown in FIG. 10, in the transparent state with no voltage applied, the liquid crystal components 332A and the polymer network 131 in the central portion 306 were aligned horizontally to the surfaces of the substrates 310 and 320 and in the longitudinal direction of the substrates 310 and 320. In other words, the twist angle of the liquid crystal components in the central portion 306 was 0°.

In contrast, the liquid crystal components 332A and the polymer network 131 in the first end portion 305A and the second end portion 305B are both twisted in the direction from the substrate 310 toward the substrate 320. When the liquid crystal panel 301 is observed from the direction normal to the liquid crystal panel 301, an angle of 89° was formed by the alignment azimuth of the liquid crystal components 332B present near one of the substrates 310 with the alignment azimuth of the liquid crystal components 332B present near the other of the substrates 320. In other words, the twist angle of the liquid crystal components 332B in the first end portion 305A and the second end portion 305B was 89°.

In the transparent state, there was almost no difference in abnormal light refractive index ne and normal light refractive index no between the liquid crystal components 332A and 332B and the polymer network 131, so that the light emitted from the light source passed through the polymer dispersed liquid crystal layer 130 to provide a transparent state.

As shown in FIG. 11, when voltage is applied between the electrodes 112 and 122, a vertical electric field is generated in the thickness direction of the polymer dispersed liquid crystal layer 130, which raises the liquid crystal components 332A and 332B. In contrast, the alignment azimuth of the polymer network 131 does not change. This increases the difference in abnormal light refractive index ne and normal light refractive index no between the liquid crystal components 332A and 332B and the polymer network 131. Light emitted from the light source is therefore scattered by the polymer dispersed liquid crystal layer 130.

The display device of Example 3 in the scattering state achieved a front contrast ratio of 5 or more and a luminance of 100 cd/m² or higher in the central portion 306 of the liquid crystal panel 301, and a front contrast ratio of 5 or more and a luminance of 150 cd/m² or higher in the first end portion 305A and the second end portion 305B of the liquid crystal panel 301. The display device of Example 3 showed a high degree of scattering throughout the plane of its liquid crystal panel, although showing a lower degree of scattering in the end portions than the display device of Example 1.

REFERENCE SIGNS LIST 1, 101, 201, 301: liquid crystal panel
2A, 102A: first light source
2B, 102B: second light source
4: air layer
5A, 105A, 205A, 305A: first end portion
5B, 105B, 205B, 305B: second end portion
6, 106, 206, 306: central portion
8, 108: sealant
10, 20, 110, 120, 310, 320: transparent substrate
11, 21, 111, 121: transparent base material
12, 22, 112, 122: electrode
13, 23, 113, 123, 313, 323: alignment film
30, 130: polymer dispersed liquid crystal layer
31, 131: polymer network
32, 132A, 132B, 232A, 232B, 332A, 332B: liquid crystal component
100: display device
107: partition wall

What is claimed is:

1. A display device comprising:
   a liquid crystal panel including a pair of substrates and a polymer dispersed liquid crystal layer held between the substrates, and
   a light source behind a back surface of the liquid crystal panel,
   the substrates including an electrode that applies voltage to the polymer dispersed liquid crystal layer,
   the polymer dispersed liquid crystal layer containing a polymer network and liquid crystal components dispersed in the polymer network,
   the light source being apart from the liquid crystal panel with an air layer in between, extending along at least one outer edge of the liquid crystal panel, and configured to emit light toward the liquid crystal panel from an oblique direction,
   the polymer dispersed liquid crystal layer being controlled to be in a transparent state where a background is seen through the display device with no voltage applied and shift into a scattering state where light emitted from the light source and incident on the polymer dispersed liquid crystal layer is scattered with voltage applied,
   the polymer dispersed liquid crystal layer including, in a plan view, an end portion closer to the light source and a central portion farther from the light source than the end portion is,
   the end portion and the central portion each having, in the scattering state, an angle dependence which changes a transmittance of light to be emitted from a front surface based on an angle at which light is incident on a back surface of the polymer dispersed liquid crystal layer, with the angle dependence of the end portion being different from the angle dependence of the central portion,
   the light source irradiating the end portion and the central portion with light at different angles.

2. The display device according to claim 1, wherein the liquid crystal components in the central portion have a higher anisotropy of refractive index than the liquid crystal components in the end portion.

3. The display device according to claim 1, wherein the polymer dispersed liquid crystal layer contains a chiral agent in the end portion and does not contain a chiral agent in the central portion.

4. The display device according to claim 1, wherein with no voltage applied, a twist angle of the liquid crystal components in the end portion is greater than a twist angle of the liquid crystal components in the central portion.

5. The display device according to claim 1, wherein the polymer dispersed liquid crystal layer contains a chiral agent in both the central portion and the end portion and has a greater thickness in the end portion than in the central portion.

6. The display device according to claim 1, wherein the polymer dispersed liquid crystal layer has a higher density of the polymer network in the central portion than in the end portion.

7. The display device according to claim 1, wherein the electrode includes a pair of electrodes that are disposed in the respective substrates and face toward the polymer dispersed liquid crystal layer.

8. The display device according to claim 1, wherein the light source includes light-emitting elements of multiple colors, and the light-emitting elements of multiple colors are driven based on a field-sequential color system in which the light-emitting elements are turned on time-divisionally.

* * * * *